March 8, 1949.   J. T. LLOYD ET AL   2,463,704
INDUCING YOUNG POULTRY, ESPECIALLY TURKEYS, TO EAT
Filed June 13, 1945

John T. Lloyd
Mortimer Bye
INVENTORS

BY Zugelter & Zugelter
Atty's.

Patented Mar. 8, 1949

2,463,704

UNITED STATES PATENT OFFICE 2,463,704

INDUCING YOUNG POULTRY, ESPECIALLY TURKEYS, TO EAT

John T. Lloyd and Mortimer Bye, Cincinnati, Ohio

Application June 13, 1945, Serial No. 599,274

2 Claims. (Cl. 99—2)

The present invention relates to an improvement in inducing young incubator hatched poultry, especially turkeys, to eat.

An object of the invention is to minimize the mortality of young turkeys or poultry, and thereby reduce the risk of loss connected with poultry raising.

Another object of the invention is to provide an improved method and means of inducing the poults to feed soon after hatching in an incubator, thereby to avoid the likelihood of starvation and the contraction of diseases attributable to malnutrition.

Another object is to accomplish the foregoing objectives by the use of simple and inexpensive stimulator means of a reliable and effective character, the use of which involves no handling or individual treatment of the poults.

The foregoing and other objects are attained by the means described herein and illustrated in the accompanying drawing in which.

Figure 1:
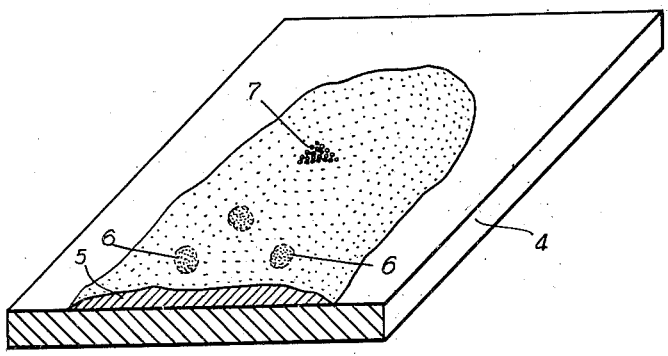
Fig. 1 is a cross-sectional view of a feeding tray, supplied with the means of the invention for inducing the poults to feed.
Figure 2:
Fig. 2 is a view of a stimulator, in the form of a pellet, slug, pill or tablet produced in accordance with the invention.

Among the outstanding causes of mortality of young incubator hatched poultry, especially turkeys, are starvation and a variety of diseases attributable to malnutrition. Difficulties in the raising of poultry, and principally turkeys, have been due to the initial lack of instinct or refusal of the poults to eat during the first few days after hatching. The problem of inducing the young poults to feed is one of great magnitude where large flocks are concerned, and as a result thereof, losses are frequently very high and tend to discourage production on a large scale. It has been found that the present invention has solved to a great extent, the problem of reducing the mortality of incubator hatched poultry, especially turkeys.

In accordance with the invention, the feed tray 4 is furnished with the usual supply of prepared feed or starting mash indicated at 5, and upon the top of this is placed a stimulator design to possess a visual appeal so that the curiosity of the poults attracts them to the stimulator and starts instinctive pecking. At the same time, the poults actually obtain food, and the taste for food is stimulated, due to the fact that the stimulator itself is in food form. Thus, the object is to attract the vision of the poults, and initiate the eating process at the same time. This is accomplished by furnishing stimulators formed from feed brightly colored by means of dyes or otherwise, and furnished in the form of pellets, wafers, slugs, pills, tablets, flakes, discs, granules, or finer particles, to be placed on top of a supply of regular starting mash or other prepared feed, where the poults may readily see the bright colors incorporated in the stimulator. It has been demonstrated that stimulators in any of the forms mentioned, if brightly colored, will soon attract the poults and develop their taste for food in the earliest stages of development. The elements of starvation and malnutrition are thereby effectively minimized as a hazard in the raising of young turkeys or other poultry.

The stimulator in one form, as indicated at 6, may be a coherent mass of edible feed particles, for example corn meal or a bleached grain of one kind or another, which has been subjected to a coloring treatment. The coherent mass of feed particles, therefore, is not only attractive to the poults by reason of the bright coloring incorporated therein, but is edible also and possesses a food value such as will nourish the poults in the early stages of their existence, as well as to teach them the taste of food and increase the appetite for same.

Although corn meal has been mentioned as the material of which the stimulator may be constituted, it should be understood that any other edible material which will afford the proper nourishment and at the same time admit of coloring with bright shades of various colors, will perform the desired function of establishing a visual appeal to the poults. It will be understood that in pecking at the brightly colored material of the stimulator, the poults acquire actual food even though their bills might fail to pick up any of the prepared feed or starting mash indicated at 5. It may here be noted that the feed indicated at 5 generally is not at all attractive to the poults, because of its dull brown color and lack of distinctiveness with respect to surrounding objects.

Figure 4:
Fig. 4 is a view of the stimulator in flake form.

The stimulator may be formed as a pellet, slug, disc, wafer, pill or tablet, by any one of various methods of producing such objects, for example, by means of compressive force in a tablet machine, or possibly by means of an extrusion process in accordance with known practices. The flake form, as indicated at 8 of Fig. 4, may be produced by rolling, pressing, or otherwise. In some cases, it may be desirable to incorporate cod liver oil or other vitamins, minerals, or disease preventative ingredients in the stimulators. Cohesion of the particles may, when necessary, be induced by incorporating a suitable binder or adhesive material in the corn meal or other feed preparatory to forming the pills or tablets.

Figure 3:
Fig. 3 is a view of a stimulator in the form of a group or pile of granules or particles, treated in accordance with the invention.

In producing the stimulator in granule or powder form, as suggested by Fig. 3, the food is merely ground, chopped, or otherwise processed to small size, which the poult may swallow, and is then subjected to a dyeing treatment for imparting the bright colors as previously mentioned. The brightly colored granules supply the necessary inducement to feeding, by merely sprinkling them or piling them in small heaps, as at 7, upon the top of the mash or prepared feed indicated at 5.

The coloring material used in making the food attractive to the poults, may or may not possess food value or medicinal properties, and the invention is to be understood as embracing suitable coloring material regardless of its inherent secondary qualities. Blues, greens, reds, yellows, and various shades of those colors have been found attractive to the poults, provided that the colors are bright rather than dull. The effectiveness of the colors is best maintained by using the dyes upon a white or substantially white grain or other food product, as will be understood.

In the pellet, slug, pill, disc, flake, or tablet form, the stimulator is not necessarily so firmly compressed or packed as to avoid disintegration as the poults peck it. By preference, it should be approximately pea size, and susceptible to breaking up or separating into parts or small chunks which the poults may readily swallow. The breaking or disintegrating characteristic may best be initiated by the poults if the stimulator is made rough or irregular in form, rather than smooth and hard.

The stimulator in any of its forms may conveniently be packaged and shipped in bottles, cans, boxes or any suitable type of container, and no inconvenience or individual handling of the poultry is necessary to the proper use thereof.

What is claimed is:

1. For initiating and developing the eating habit of newly hatched fowl, the combination which comprises a bed of finely divided prepared mash feed, and a multiplicity of substantially larger particles of an edible stimulator having food value and incorporating coloring matter of such character as to attract the attention of the fowl, the stimulator particles having a color which contrasts with the color of the mash feed, said particles of edible stimulator being disintegratable by pecking of the fowl and being placed upon the bed of mash feed so that the fowl attracted to and pecking and disintegrating the stimulator particles coincidentally picks up particles of the surrounding mash feed.

2. For initiating and developing the eating habit of newly hatched fowl, the combination which comprises a bed of finely divided prepared mash feed and a multiplicity of substantially larger particles of an edible stimulator having food value and incorporating coloring matter of such color as to attract the attention of the fowl, the stimulator particles having a color which contrasts with the color of the mash feed, said particles of edible stimulator being disintegratable by pecking of the fowl and being placed upon the bed of mash feed so that the fowl attracted to and pecking and disintegrating the stimulator particles and such parts thereof as fall onto the mash feed incident to the pecking, coincidentally picks up and swallows some of the surrounding mash feed.

JOHN T. LLOYD.
MORTIMER BYE.

REFERENCES CITED

The following references are of record in the file of this patent:

UNITED STATES PATENTS

| Number | Name | Date |
|---|---|---|
| 826,990 | Cartwright | July 24, 1906 |
| 849,011 | Murray | Apr. 2, 1907 |
| 1,045,716 | Mack et al. | Nov. 26, 1912 |
| 1,178,279 | Uffel | Apr. 4, 1916 |

FOREIGN PATENTS

| Number | Country | Date |
|---|---|---|
| 439,122 | Great Britain | 1935 |
| 87,507 | Sweden | 1936 |